United States Patent
Warren et al.

(10) Patent No.: US 10,557,373 B2
(45) Date of Patent: Feb. 11, 2020

(54) LOW PROFILE EMBEDDED BLADE TIP CLEARANCE PROBE ASSEMBLY

(71) Applicant: United Technologies Corporation, Farmington, CT (US)

(72) Inventors: Eli Cole Warren, Wethersfield, CT (US); Kevin A Ford, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 176 days.

(21) Appl. No.: 15/832,376

(22) Filed: Dec. 5, 2017

(65) Prior Publication Data

US 2019/0170011 A1    Jun. 6, 2019

(51) Int. Cl.
| | |
|---|---|
| *F01D 25/24* | (2006.01) |
| *F01D 21/00* | (2006.01) |
| *F04D 29/52* | (2006.01) |
| *G01B 7/14* | (2006.01) |
| *G01B 5/00* | (2006.01) |
| *G01H 11/06* | (2006.01) |
| *G01H 1/00* | (2006.01) |

(52) U.S. Cl.
CPC ......... *F01D 21/003* (2013.01); *F04D 29/526* (2013.01); *G01B 5/0014* (2013.01); *G01B 7/14* (2013.01); *G01H 1/006* (2013.01); *G01H 11/06* (2013.01); *F05D 2220/32* (2013.01); *F05D 2230/20* (2013.01); *F05D 2240/14* (2013.01); *F05D 2260/83* (2013.01)

(58) Field of Classification Search
CPC .............. F04D 29/526; F05D 2240/14; F05D 2260/83; F01D 11/20; F01D 21/003
See application file for complete search history.

(56) References Cited

U.S. PATENT DOCUMENTS

| | | | |
|---|---|---|---|
| 4,804,905 A | 2/1989 | Ding et al. | |
| 4,813,273 A | 3/1989 | Parsons | |
| 5,818,242 A * | 10/1998 | Grzybowski | F01D 11/025 324/642 |
| 6,739,120 B2 * | 5/2004 | Moniz | F01D 5/022 60/226.1 |
| 9,518,850 B2 | 12/2016 | Warren | |
| 9,709,376 B2 | 7/2017 | Zhe et al. | |
| 10,077,992 B2 * | 9/2018 | Warren | G01D 11/16 |
| 2010/0079136 A1 * | 4/2010 | Phillips | F01D 11/20 324/207.16 |
| 2014/0064924 A1 * | 3/2014 | Warren | G01B 7/14 415/118 |
| 2014/0064926 A1 | 3/2014 | Warren | |
| 2014/0076037 A1 | 3/2014 | Warren | |
| 2016/0195411 A1 | 7/2016 | Ford et al. | |

OTHER PUBLICATIONS

European Patent Office, European Search Report dated Nov. 27, 2018 in Application No. 18198169.7.

* cited by examiner

*Primary Examiner* — Ninh H. Nguyen
(74) *Attorney, Agent, or Firm* — Snell & Wilmer, L.L.P.

(57) ABSTRACT

A low profile embedded BTC probe may comprise a housing having a cavity disposed radially outward of a blade, a lower insulator disposed within the cavity, a sensor element disposed within the cavity, an upper insulator disposed within the cavity, a cap wherein the cap fills a remainder of the cavity, and a hard lead in electronic communication with the sensor element and the housing.

16 Claims, 13 Drawing Sheets

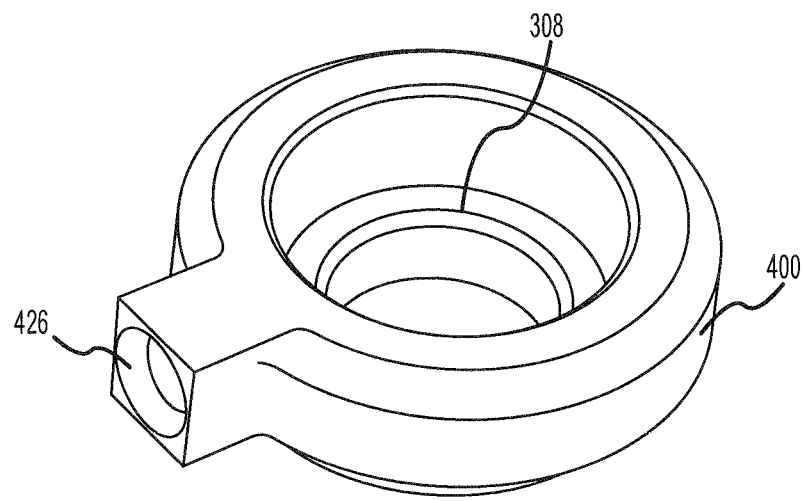
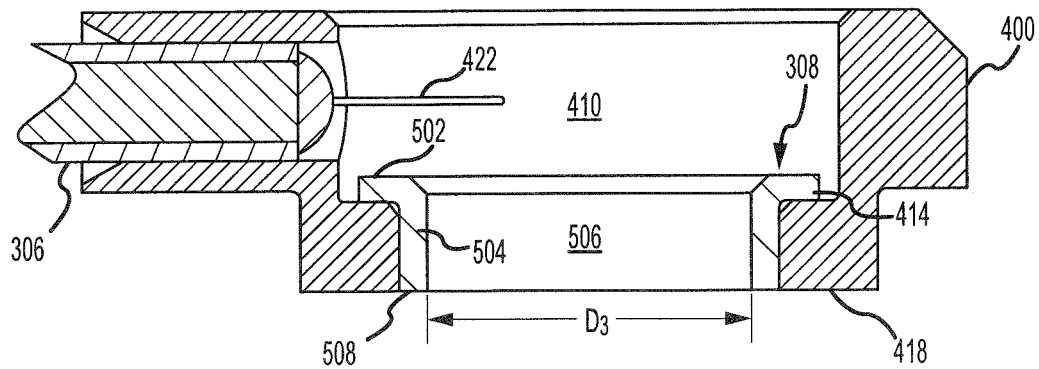
FIG.5
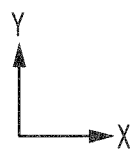

LOW PROFILE EMBEDDED BLADE TIP CLEARANCE PROBE ASSEMBLY

GOVERNMENT LICENSE RIGHTS

This disclosure was made with government support under contract FA8650-09-D-2923-0021 and awarded by the United States Air Force. The government has certain rights in the disclosure.

FIELD

The disclosure relates generally to fan Blade Tip Clearance (BTC) sensors and fan cases in gas turbine engines.

BACKGROUND

Gas turbine engine efficiency is directly related to the level of control of the gap between the blade tip and the outer air seal. In various embodiments, a capacitance-based BTC probe (cap probe) may be placed in the outer air seal to monitor this gap. Traditional cap probes and cap probe installations tend to alter engine structures comprising the outer air seal, tending thereby to alter the air seal and tending to reduce engine efficiency.

SUMMARY

In various embodiments the present disclosure provides a low profile embedded BTC probe, comprising a housing having a cavity disposed radially outward of a blade, a lower insulator disposed within the cavity, a sensor element disposed within the cavity, an upper insulator disposed within the cavity, a cap wherein the cap fills a remainder of the cavity, and a hard lead in electronic communication with the sensor element and the housing.

In various embodiments, the housing further comprises a top surface, a bottom surface, a step, and a first bore, wherein the cavity extends from the top surface to the step, wherein the first bore extends from the step through the bottom surface, wherein the cavity comprises a first diameter and the first bore comprises a second diameter wherein the second diameter is less than the first diameter. In various embodiments, the lower insulator further comprises a first flange, a cylindrical extrusion, and a second bore comprising a third diameter wherein the third diameter is less than the second diameter, wherein the first flange is in contact with the step and wherein the cylindrical extrusion is disposed within the first bore. In various embodiments, the sensor element comprises a cylinder having a base and second flange opposite the base, wherein the second flange is in contact with the first flange and the cylinder is disposed within the second bore. In various embodiments, the upper insulator comprises a first alignment hole and a clearance cutout. In various embodiments, the cap comprises disk having an upper surface and a lower surface, a second alignment hole through the upper surface and the lower surface, and a hemispherical clearance cutout proximate the lower surface, wherein the lower surface is in contact with the upper insulator. In various embodiments, an internal stress is locked within the low profile embedded BTC probe in response to coupling the cap to the housing. In various embodiments, the housing comprises a first coefficient of thermal expansion (CTE), the sensor element comprises a second CTE, the cap comprises a third CTE, the upper insulator and the lower insulator comprise a fourth CTE, and wherein the first CTE, the second CTE, the third CTE, and the fourth CTE are selected such that an average of the second CTE, the third CTE, and the fourth CTE is greater than the first CTE. In various embodiments, a difference between a combined axial growth, comprising an axial growth along an axis of the sensor element, an axial growth along an axis of the upper insulator, and an axial growth along an axis of the lower insulator in response to a temperature, and at least one of an axial growth of the housing along the axis of the sensor element in response to the temperature or an axial growth of the cap along the axis of the sensor element in response to the temperature is between about 0.00001 inches and 0.0004 inches where about in this context means±0.000001 inches.

In various embodiments, the present disclosure provides a gas turbine engine comprising a compressor section configured to compress a gas, a combustor section aft of the compressor section and configured to combust the gas, and a fan section comprising a fan having a blade having a tip, a fan case having an inner aerodynamic surface and a rub strip the blade proximate the inner aerodynamic surface, and a low profile embedded BTC probe, comprising a housing having a cavity disposed radially outward of a blade, a lower insulator disposed within the cavity, a sensor element disposed within the cavity, an upper insulator disposed within the cavity, a cap wherein the cap fills a remainder of the cavity, and a hard lead in electronic communication with the sensor element and the housing.

In various embodiments, the housing further comprises a top surface, a bottom surface, a step, and a first bore, wherein the cavity extends from the top surface to the step, wherein the first bore extends from the step through the bottom surface, wherein the cavity comprises a first diameter and the first bore comprises a second diameter wherein the second diameter is less than the first diameter. In various embodiments, the lower insulator further comprises a first flange, a cylindrical extrusion, and a second bore comprising a third diameter wherein the third diameter is less than the second diameter, wherein the first flange is in contact with the step and wherein the cylindrical extrusion is disposed within the first bore. In various embodiments, the sensor element comprises a cylinder having a base and second flange opposite the base, wherein the second flange is in contact with the first flange and the cylinder is disposed within the second bore. In various embodiments, the upper insulator comprises a first alignment hole and a clearance cutout. In various embodiments, the cap comprises disk having an upper surface and a lower surface, a second alignment hole through the upper surface and the lower surface, and a hemispherical clearance cutout proximate the lower surface, wherein the lower surface is in contact with the upper insulator. In various embodiments, an internal stress is locked within the low profile embedded BTC probe in response to coupling the cap to the housing. In various embodiments, the housing comprises a first coefficient of thermal expansion (CTE), the sensor element comprises a second CTE, the cap comprises a third CTE, the upper insulator and the lower insulator comprise a fourth CTE, and wherein the first CTE, the second CTE, the third CTE, and the fourth CTE are selected such that an average of the second CTE, the third CTE, and the fourth CTE is greater than the first CTE. In various embodiments, a difference between a combined axial growth, comprising an axial growth along an axis of the sensor element, an axial growth along an axis of the upper insulator, and n axial growth along an axis of the lower insulator in response to a temperature, and at least one of an axial growth of the housing along the axis of the sensor element in response to the temperature or an axial growth of the cap along the axis of the sensor element in response to the temperature is between about 0.00001 inches and 0.0004 inches where about in this context means±0.000001 inches.

In various embodiments, the present disclosure provides a low profile embedded BTC probe, the method comprising forming a housing having a first CTE, a cavity, and a neck, inserting a hard lead comprising a hard shield and a lead wire into the neck, and coupling the hard lead to the neck about the hard shield, bending the lead wire toward a sidewall of the cavity and inserting a lower insulator having a fourth CTE into the cavity past the lead wire, wherein the lower insulator comprises a bore, coupling an alignment fixture having an alignment pin to the housing and inserting the alignment pin into the cavity, inserting a sensor element having a second CTE into the cavity past the lead wire and into the bore of the lower insulator and aligning the sensor element with the alignment pin, coupling the lead wire to the sensor element, aligning an upper insulator having the fourth CTE and comprising a clearance cutout with the alignment pin, inserting the upper insulator into the cavity, aligning a cap having a third CTE with the alignment pin and filling a remainder of the cavity with the cap, and coupling the cap to the housing while a compressive force F is applied to the cap. In various embodiments, the method may further comprise determining the compressive force F in response to a difference between at least one of the first CTE, the second CTE, the third CTE, and/or the fourth CTE, and selecting the first CTE, the second CTE, the third CTE, and the fourth CTE such that an average of the second CTE, the third CTE, and the fourth CTE is greater than the first CTE.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 5 illustrates a lower insulator within a housing of a low profile embedded BTC probe, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
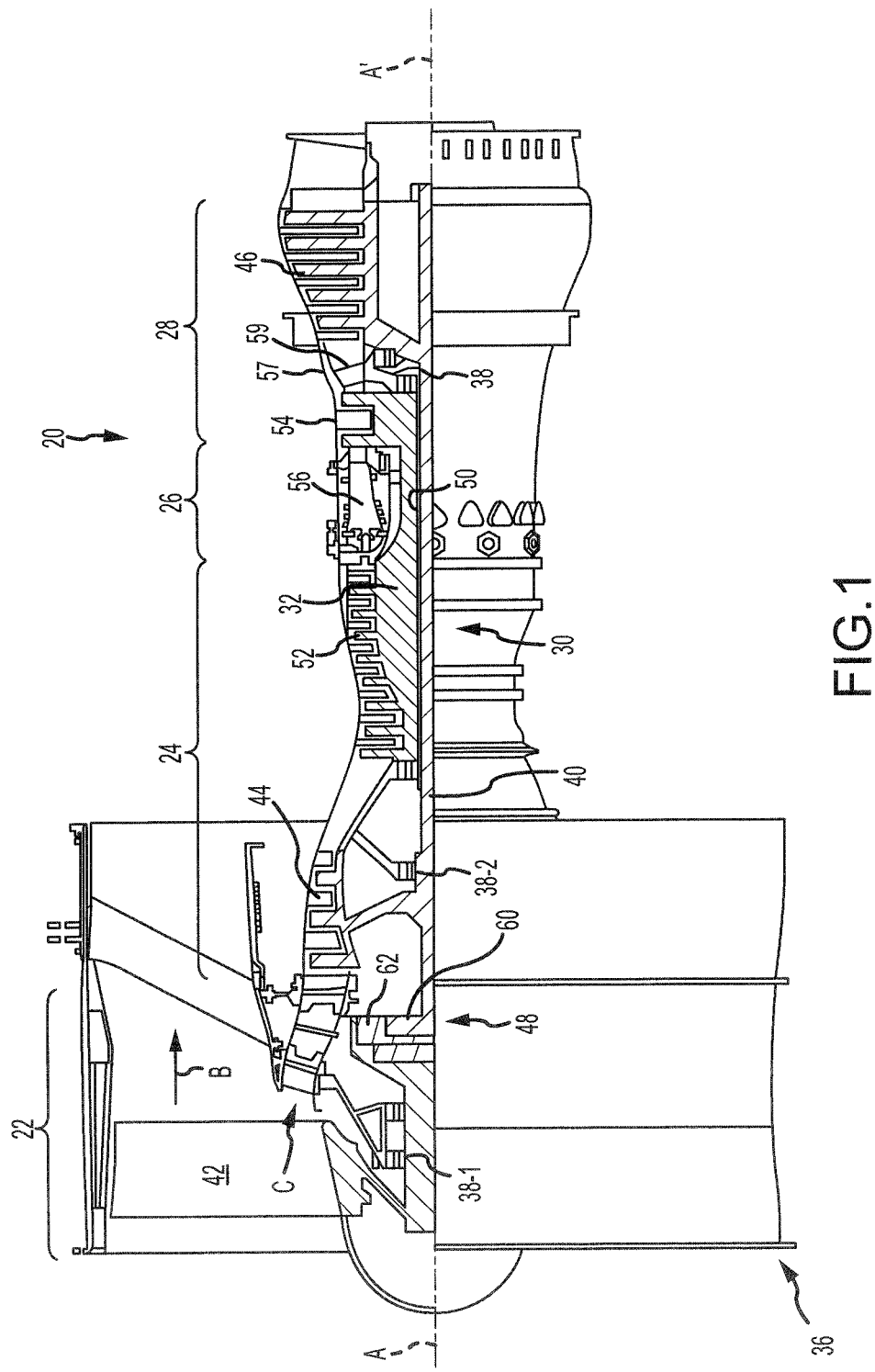
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Figure 2:
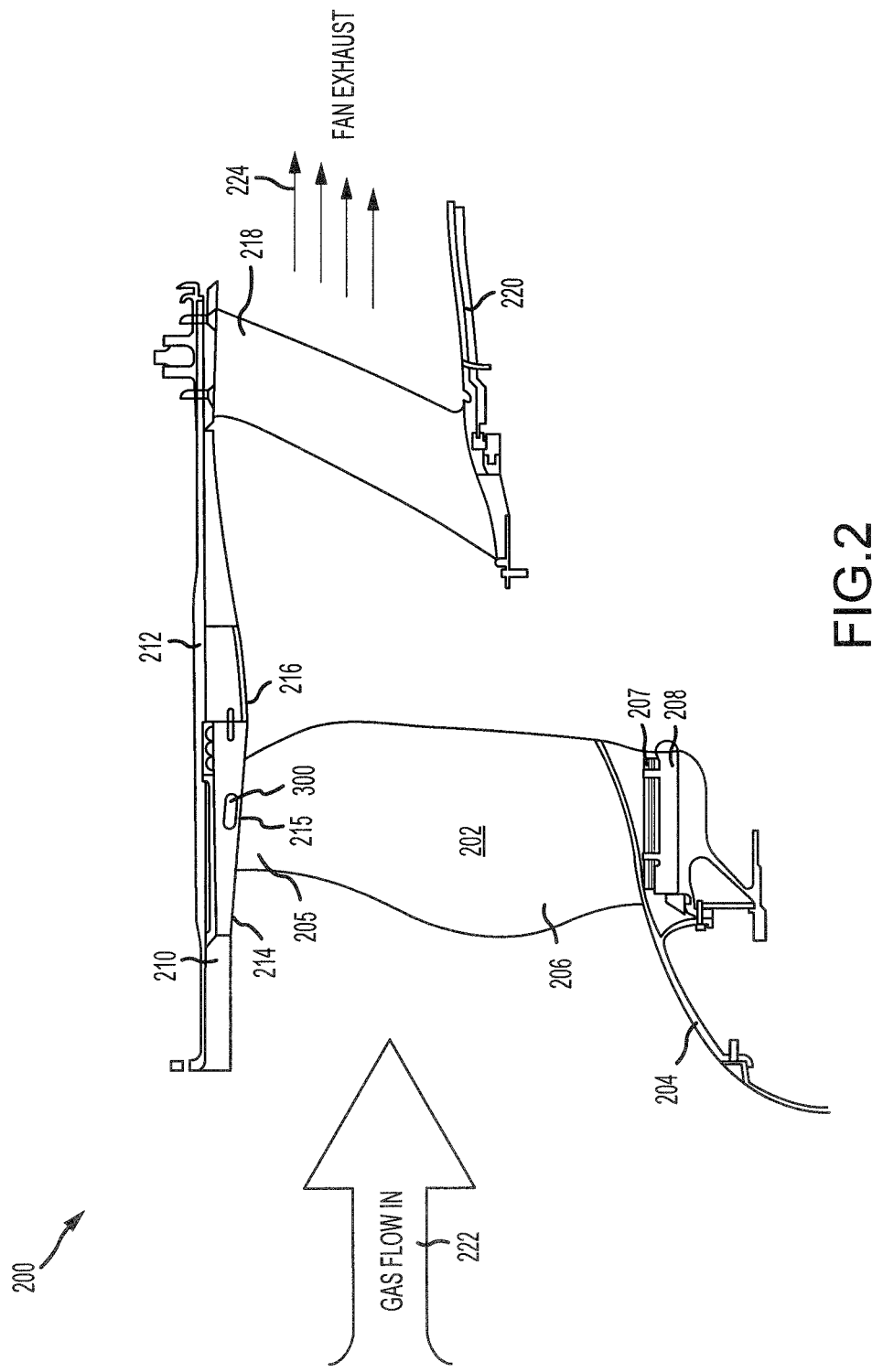
FIG. 2 illustrates a fan section having a low profile embedded BTC probe, in accordance with various embodiments.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference to FIGS. 1 and 2, a fan section 200 having a fully integral epoxy cap probe, is provided. Fan 202 comprises blade 206 coupled at blade root 207 to a fan disk 208 and compressor inlet cone 204. Fan 202 may be coupled to a shaft, such as inner shaft 40, where inner shaft 40 may be in mechanical communication with geared architecture 48, or may be in mechanical communication with the low spool shaft 60 directly. Tip 205 of blade 206 lies proximate rub strip 214 which forms a part of the inner aerodynamic surface 216 of fan case 210. A low profile embedded BTC probe 300 lies radially outward of blade 206 and proximate tip 205 between inner aerodynamic surface 216 and outer casing 212 of fan case 210. In various embodiments, low profile embedded BTC probe 300 comprises a portion of rub strip 214 and may be co-molded in part with rub strip 214 or may be embedded within rub strip 214. Fan case 210 may be coupled at an aft end to pylon 218 which may be coupled to compressor casing 220. As fan 202 rotates about the shaft it tends to draw in gas 222, such as, for example air, at the fore end of fan case 210. Rotating fan 202 tends to accelerate gas 222 along inner aerodynamic surface 216 toward pylon 218 passing between inner aerodynamic surface 216 and compressor casing 220 as fan exhaust 224.

In various embodiments, portion of gas 222 may escape fan 202 by passing over tip 205 through a gap 215 between tip 205 and inner aerodynamic surface 216 tending to decrease efficiency. In various embodiments, the width of gap 215 between tip 205 and inner aerodynamic surface 216 may vary with respect to a position along the chord line of blade 206. The low profile embedded BTC probe 300 may be located axially (relative to the axis of rotation of fan 202, with momentary reference to A-A' in FIG. 1) within a bounded portion of rub strip 214 bounded at the forward end by a leading edge of blade 206 and at the aft end by a trailing edge of blade 206. In various embodiments, a plurality of a low profile embedded BTC probes may be located axially within the bounded portion of rub strip 214 along the chord of blade 206. In various embodiments, a plurality of a low profile embedded BTC probes may be located circumferentially around fan section 200 within the bounded portion of rub strip 214.

Figure 3A:
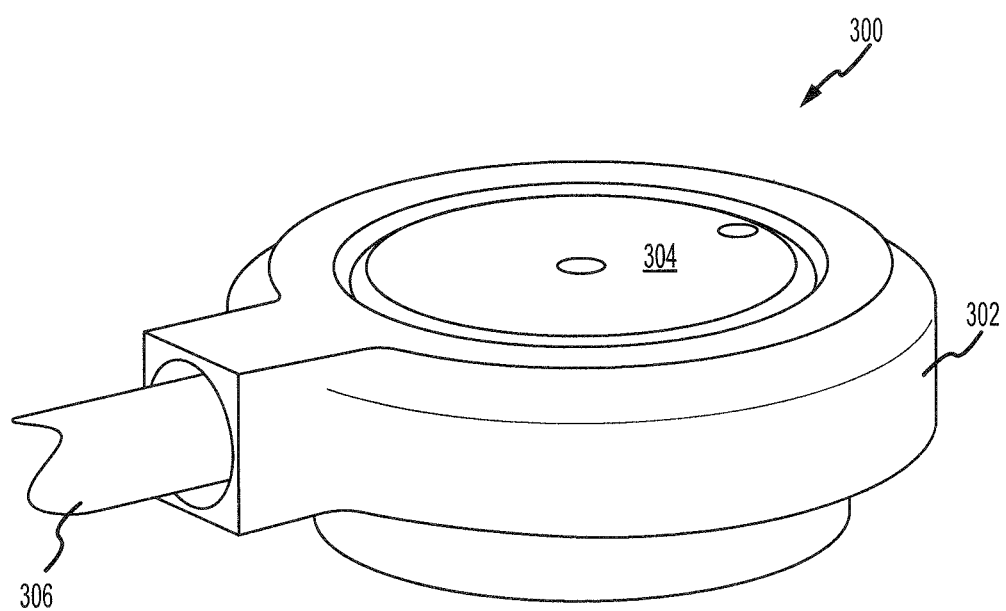
FIG. 3A illustrates a low profile embedded BTC probe, in accordance with various embodiments.
Figure 3B:
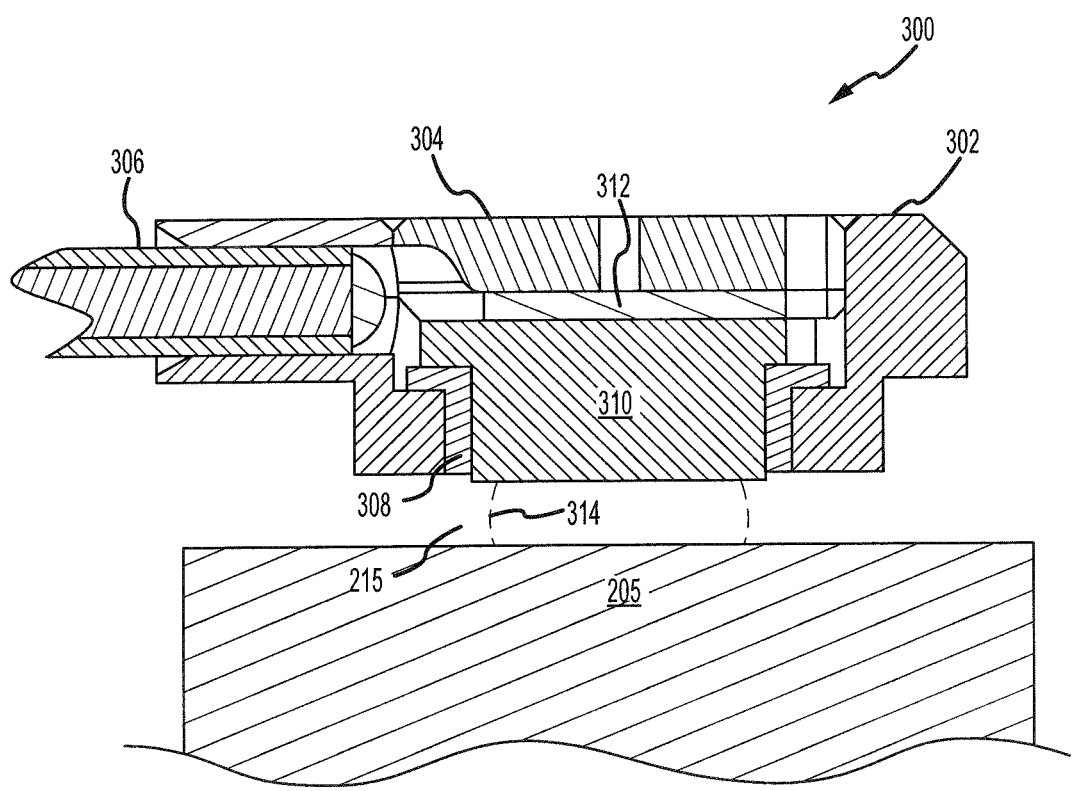
FIG. 3B illustrates a low profile embedded BTC probe, in accordance with various embodiments.

With additional reference to FIGS. 3A and 3B, a low profile embedded BTC probe 300 comprises a housing 302 and a cap 304. In various embodiments, housing 302 may comprise a portion of rub strip 214. In various embodiments, hard lead 306 may be inserted through housing 302. In various embodiments, and with brief reference to FIG. 4B, a hard lead such as hard lead 306 may be a shield lead and comprise a lead wire 422 and a hard shield 420 such as, for example, a metallic tube such as one of a steel, a stainless steel, an alloy, and/or an aluminum. Lead wire 422 is coupled to and is in electronic communication with sensor element 310. In various embodiments, hard shield 420 is coupled to and in electronic communication with housing 302. In various embodiments, sensor element 310 is isolated from housing 302 by a lower insulator 308 and an upper insulator 312. In various embodiments, sensor element 310, lower insulator 308 and upper insulator 312 are secured within housing 302 by a cap 304.

In various embodiments, sensor element 310 is energized by lead wire 422 and an electric field flows between sensor element 310 and housing 302. As tip 205 of blade 206 passes proximate to sensor element 310, electric field 314 tends to flow across gap 215 into blade tip 205 inducing a capacitance between the blade tip 205 and the sensor element 310 which tends to vary with respect to the width of gap 215. In this regard, the gap between a blade tip and an outer aerodynamic surface may be determined as a function of the change in capacitance occurring at a frequency which is a function of the time the blade tip dwells within the electric field.

Figure 4A:
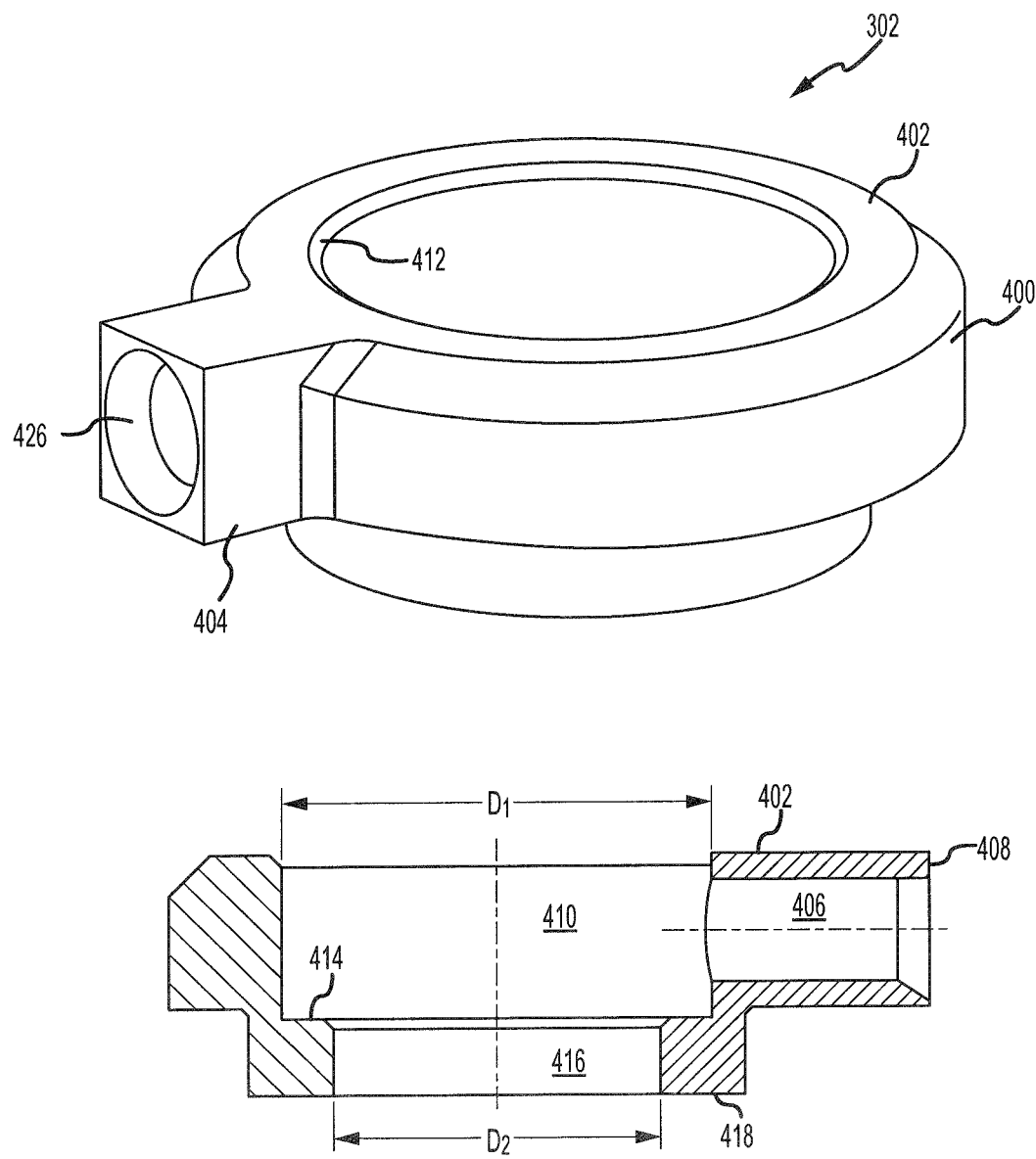
FIG. 4A illustrates a housing of a low profile embedded BTC probe, in accordance with various embodiments.
Figure 4B:
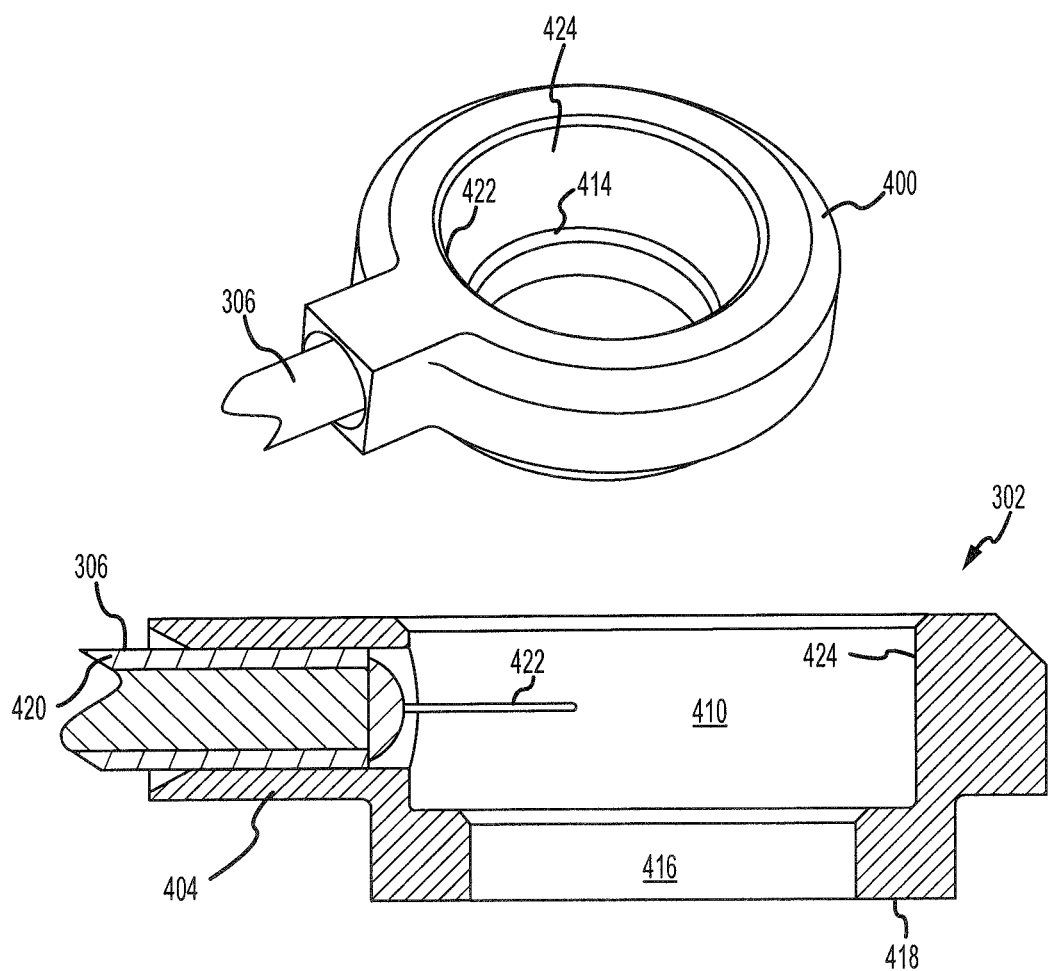
FIG. 4B illustrates a housing of a low profile embedded BTC probe, in accordance with various embodiments.

In various embodiments and with additional reference to FIGS. 4A and 4B, housing 302 of low profile embedded BTC probe 300 is shown in cross-section and in perspective. In various embodiments, housing 302 comprises body 400 having a top surface 402 which may comprise a chamfered edge and a bottom surface 418 with a neck 404 extending axially from body 400. In various embodiments, neck 404 comprises a chamfered mouth 426 leading into a passage 406 extending through the neck into a cavity 410 within body 400 which is open at top surface 402 and extends from top surface 402 downward through body 400 terminating at step 414. Body 400 further comprises a first bore 416 which extends from cavity 410 beneath step 414 and through bottom surface 418 of body 400. In various embodiments, cavity 410 may comprise a first diameter D1 and first bore 416 may comprise a second diameter D2 wherein D2 is less than D1. In various embodiments, passage 406 is sized to provide ingress for hard lead 306 which may be coupled to passage 406 at hard shield 420. In various embodiments, hard shield 420 may be coupled to passage 406 by one of brazing or welding and lead wire 422 may, prior to being coupled to sensor element 310, be bent toward sidewall 424 of cavity 410 tending thereby to provide clearance during buildup. In various embodiments, a housing such as housing 302 may comprise at least one of metal, a steel, a stainless steel, an alloy, or a nickel alloy and may have a first Coefficient of Thermal Expansion (CTE).

In various embodiments and with additional reference to FIG. 5, a lower insulator 308 of low profile embedded BTC probe 300 is shown disposed in cavity 410 having been inserted past lead wire 422 downward into first bore 416. In various embodiments, lower insulator 308 comprises a flange 502 having a thickness T1 (along the y-axis) between a top surface and a bottom surface and a cylindrical extrusion 504 extending beneath (along the y-axis) flange 502 toward a bottom surface 508 of the cylindrical extrusion 504. Flange 502 rests in contact with step 414 and cylindrical extrusion 504 is disposed within first bore 416. In various embodiments, lower insulator 308 comprises a second bore 506 through the thickness T1 of flange 502 and cylindrical extrusion 504 to bottom surface 508 having a third diameter D3 where D3 is less than D2. In various embodiments, a lower insulator such as lower insulator 308 may comprise one of a dielectric ceramic, such as, for example a 99.5% pure aluminum oxide and comprise a fourth CTE.

Figure 6:
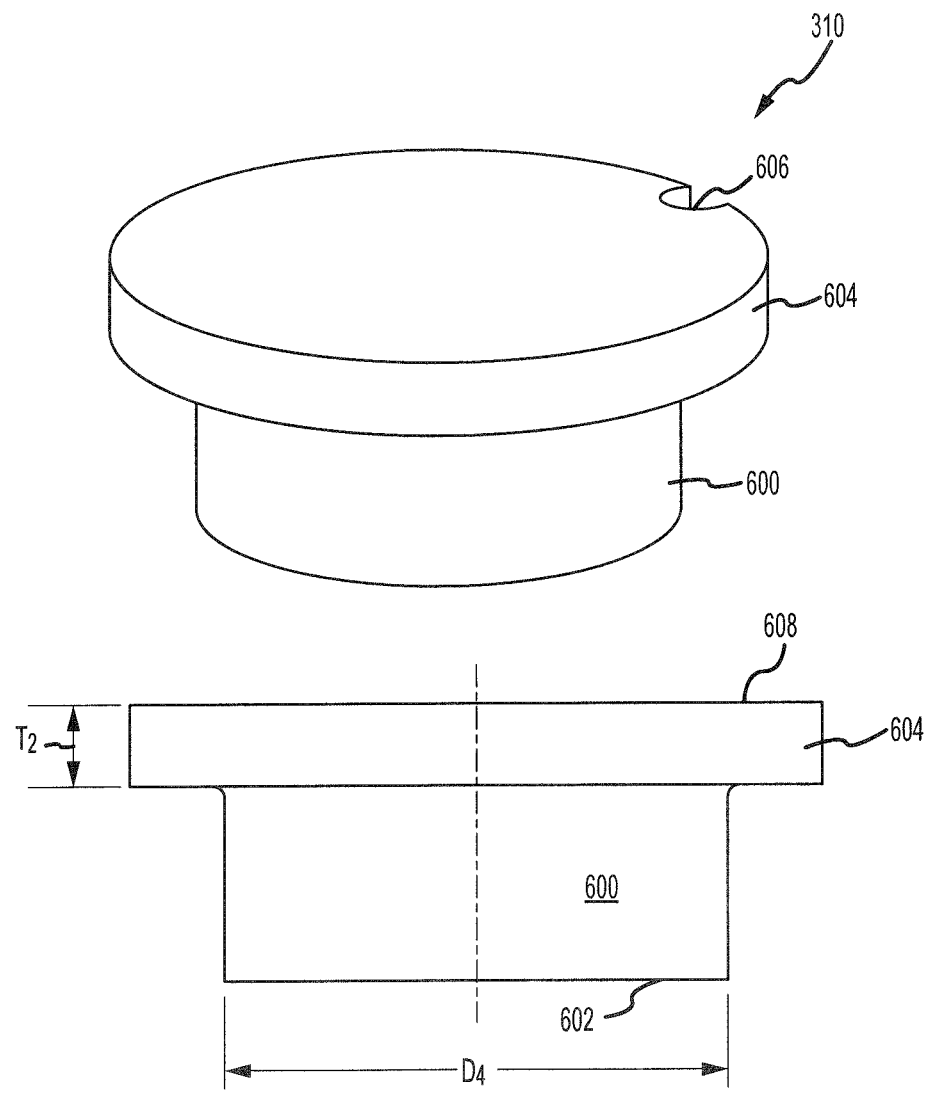
FIG. 6 illustrates a sensor element of a low profile embedded BTC probe, in accordance with various embodiments.

In various embodiments and with additional reference to FIG. 6, a sensor element 310 of low profile embedded BTC probe 300 is provided. Sensor element 310 comprises a cylinder 600 having a diameter D4 at base 602 and a flange 604 extending circumferentially about cylinder 600 and perpendicular to the axis of cylinder 600 at a top surface 608 opposite base 602. In various embodiments, flange 604 comprises a thickness T2 along the axis of cylinder 600 extending below top surface 608 toward base 602. In various embodiments, flange 604 comprises a notch 606 cut fully through the thickness T2. In various embodiments, D4 is less than D3 and flange 604 comprises a diameter greater than D3. In various embodiments, sensor element 310 may comprise at least one of a metal, an alloy, a steel, or a stainless steel and may have a second CTE.

Figure 7:
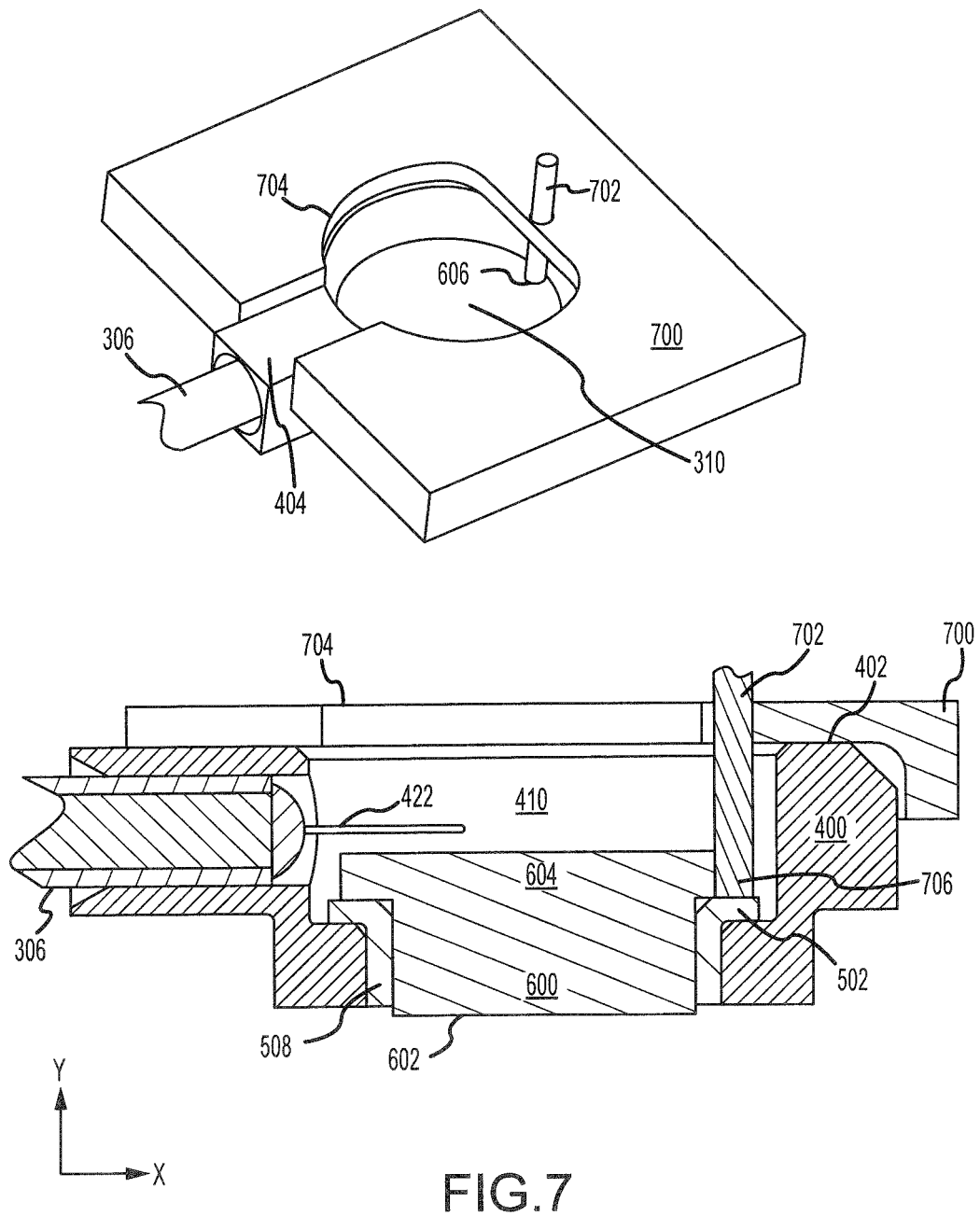
FIG. 7 illustrates a sensor element of a low profile embedded BTC probe, in accordance with various embodiments.
Figure 8:
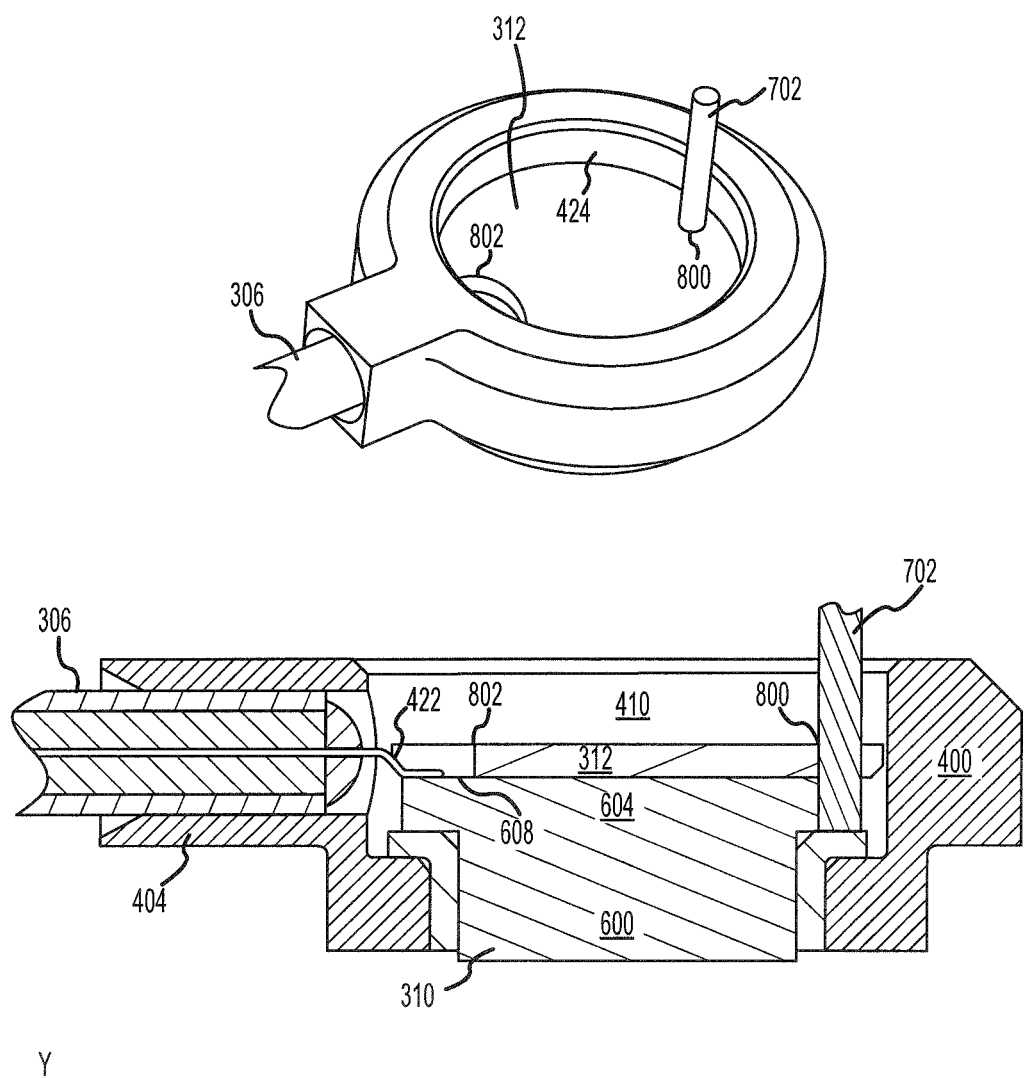
FIG. 8 illustrates an upper insulator of a low profile embedded BTC probe, in accordance with various embodiments.

In various embodiments and with additional reference to FIG. 7, a sensor element 310 is shown disposed within cavity 410 having been inserted past lead wire 422 downward (along the y-axis) into second bore 506 of lower insulator 308. In various embodiments, a fixture 700 having an alignment pin 702 and a cutout 704 may be used to guide sensor element 512 into body 400 of housing 302. Fixture 700 rests on top surface 402 of body 400 with alignment pin 702 inserted perpendicularly through fixture 700 into cavity 410 with the base 706 of alignment pin 702 resting on flange 502 of lower insulator 308. Sensor element 310 is inserted through cutout 704 of fixture 700 into cavity 410 with cylinder 600 disposed within second bore 506. Flange 604 of cylinder 600 rests on top of flange 502 of lower insulator 308 and notch 606 of flange 604 is aligned with alignment pin 702. In various embodiments, base 602 of cylinder 600 extends a distance below (along the y-axis) the bottom surface 508 of lower insulator 308. In various embodiments, a base such as base 602 may extend between In various embodiments and with additional reference to FIG. 8, upper insulator 312 is shown disposed within cavity 410 above (along the y-axis) sensor element 310. In various embodiments, upper insulator 312 comprises a first alignment hole 800 and a clearance cutout 802. In various embodiments, fixture 700 is removed leaving alignment pin 702 in place. The first alignment hole 800 of upper insulator 312 is aligned over alignment pin 702 tending thereby to align upper insulator 312 with sidewall 424 of cavity 410 and tending to align clearance cutout 802 of upper insulator 312 with lead wire 422. In various embodiments, lead wire 422 is coupled to flange 604 of sensor element 310 at top surface 608 of sensor element 310 and upper insulator 312 is moved downward along alignment pin 702 into contact with top surface 608 of sensor element 310. In various embodiments, an upper insulator such as upper insulator 312 may comprise a 99.5% pure alumina and comprise the fourth CTE.

Figure 9:
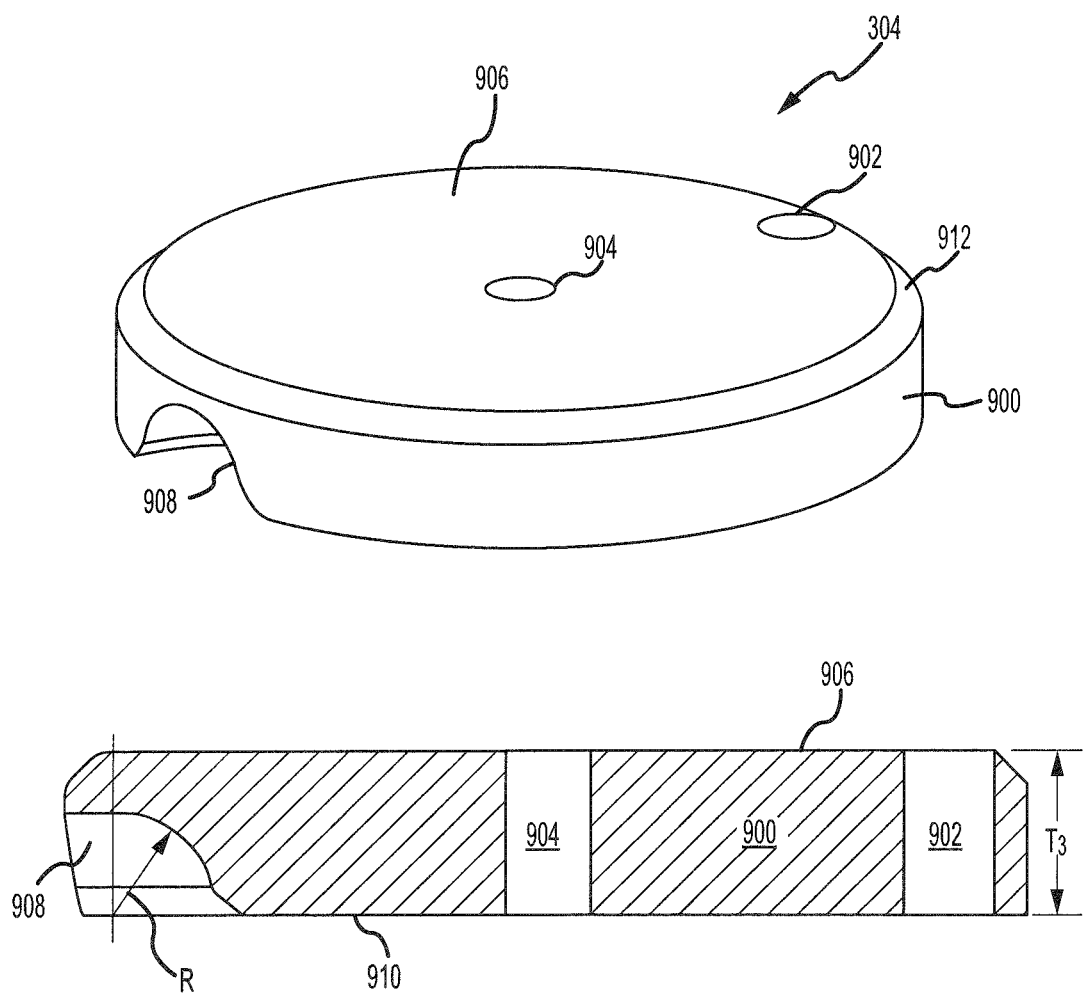
FIG. 9 illustrates a cap of a low profile embedded BTC probe, in accordance with various embodiments.

In various embodiments and with additional reference to FIG. 9, a cap 304 of a low profile embedded BTC probe 300 is provided. In various embodiments, cap 304 comprises a disk 900 having a thickness T3 defined between an upper surface 906 and a lower surface 910 of disk 900. In various embodiments, upper surface 906 may further comprise a chamfer 912 about the circumference of disk 900. In various embodiments, a second alignment hole 902 is cut fully through and a third alignment hole 904 is cut fully or partially through thickness T3. In various embodiments, cap 304 may further comprise a hemispherical clearance cutout 908 upward into disk 900 from lower surface 910. In various embodiments, hemispherical clearance cutout 908 may be defined by a radius R where R is between one tenth (1/10) of T3 and nine tenths (9/10) of T3, or between one eighth (1/8) of T3 and seven eighths (7/8) of T3, or between one third (1/3) of T3 and four fifths (4/5) of T3. In various embodiments and with brief reference to FIG. 8, T3 may be defined by a remaining portion of cavity 410 between a top surface of an upper insulator, such as upper insulator 312, and the top surface of a housing such as top surface 402 of housing 302. In various embodiments, a cap such as cap 304 may comprise at least one of metal, a steel, a stainless steel, an alloy, or a nickel alloy and may have a third CTE.

Figure 10:
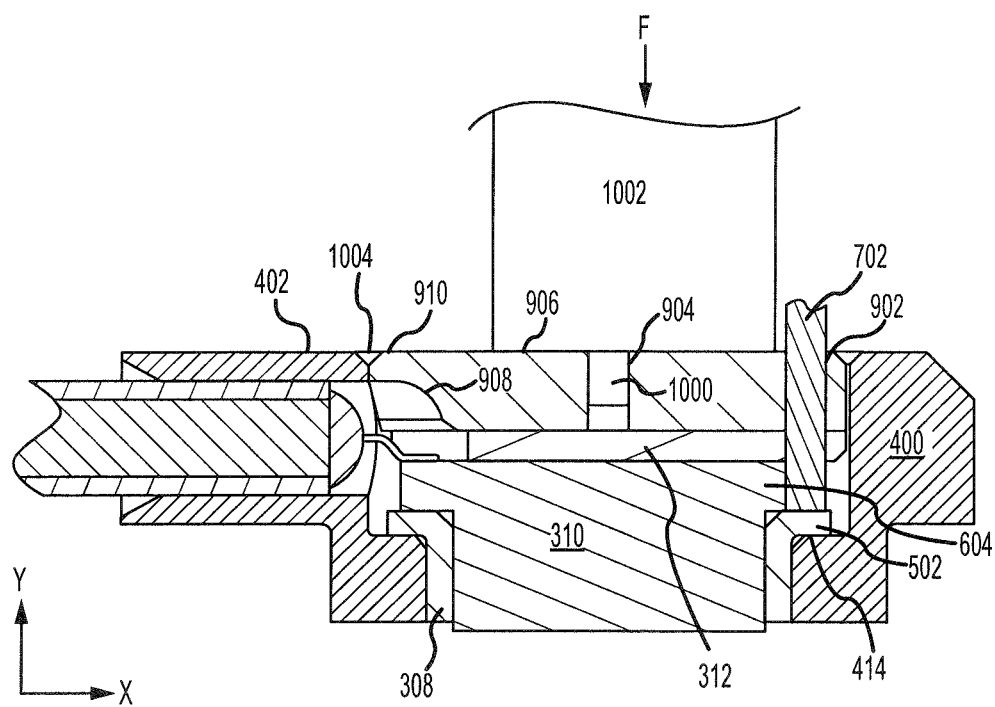
FIG. 10 illustrates a cap within a housing of a low profile embedded BTC probe, in accordance with various embodiments.

In various embodiments and with additional reference to FIG. 10, cap 304 of low profile embedded BTC probe 300 is shown filling a remainder of cavity 410 above upper insulator 132. Lower surface 910 of disk 900 is in contact with upper insulator 312 and second alignment hole 902 is centered about alignment pin 702 tending thereby to align disk 900 with sidewall 424 and tending to align hemispherical clearance cutout 908 of disk 900 with lead wire 422. In various embodiments, a press 1002 having an alignment pin 1000 is aligned above cap 304 by disposing alignment pin 1000 within third alignment hole 904 tending thereby to distribute compressive force F evenly across cap 304 and upper insulator 312 through flange 604 of sensor element 310 and flange 502 of lower insulator 308 and into body 400 of housing 302 at step 414. In response to compressive force F, the fit between cap 304, upper insulator 312, sensor element 310, lower insulator 308, and housing 302 tends to grow closer along the y-axis. In various embodiments, weld 1004 is applied between cap 304 and top surface 402 of body 400 at chamfer 912 while compressive force F is applied to cap 304. In response to weld 1004, compressive force F locked within low profile embedded BTC probe 300 as an internal stress tending thereby to preserve the fit between cap 304, upper insulator 312, sensor element 310, lower insulator 308, and housing 302.

In various embodiments, the first CTE of a housing such as housing 302, the second CTE of a sensor element such as sensor element 310, the third CTE of a cap such as cap 304, and the fourth CTE of an insulator such as upper insulator 312 and/or lower insulator 308 may be selected such that the fit between the cap, an upper insulator, the sensor element, a lower insulator, and the housing tends to grow closer along the y-axis tending thereby to preserve the fit between the components. In various embodiments, the second CTE and the fourth CTE may be selected with respect to the first CTE and the third CTE such that the growth of the sensor element and the insulator (along the y-axis) with respect to temperature is relatively greater than the growth (along the y-axis) of the housing and the cap. In various embodiments, the first CTE, the second CTE, the third CTE, and the fourth CTE may be selected such that an average of the second CTE, the third CTE, and the fourth CTE is greater than the first CTE. In various embodiments, the first CTE, the second CTE, the third CTE, and the fourth CTE may be selected to be relatively parallel. In various embodiments, the overall change in length (y-axis) between a housing such as housing 302, a sensor element such as sensor element 310, an insulator such as upper insulator 312 and/or lower insulator 308, and a cap such as cap 304 due to differences between the first CTE, the second CTE, the third CTE, and the fourth CTE may be between about 0.00001 inches [0.000254 mm] and 0.0008 inches [0.02032 mm], or between about 0.00005 inches [0.00127 mm] and 0.0006 inches [0.01524 mm], or between about 0.00001 inches [0.00254 mm] and 0.0004 inches [0.01016 mm] where about in this context means±0.000001 inches [0.000254 mm]. In various embodiments, the compressive force F may be determined in response to the differences between the first CTE, the second CTE, the third CTE, and the fourth CTE.

Figure 11:
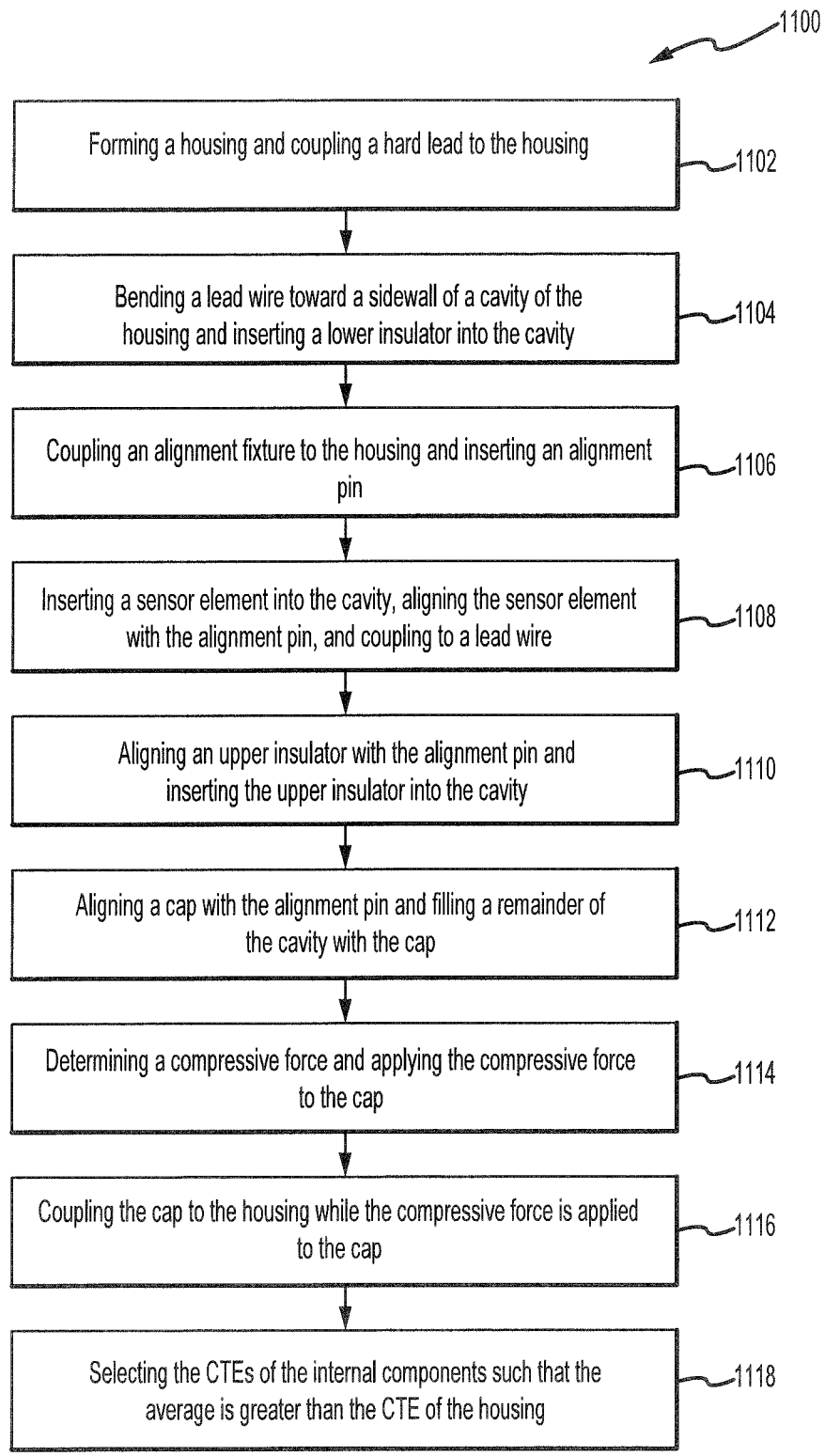
FIG. 11 illustrates a method of manufacturing a low profile embedded BTC probe, in accordance with various embodiments.

In various embodiments and with reference now to FIG. 11, a method 1100 of fabricating a low profile embedded BTC probe may comprise forming a housing (1102) having a first CTE, a cavity, and a neck; inserting a hard lead comprising a hard shield and a lead wire into the neck, and coupling the hard lead to the neck about the hard shield. The method may further comprise bending the lead wire toward a sidewall of the cavity and inserting a lower insulator (1104) having a fourth CTE into the cavity past the lead wire, wherein the lower insulator comprises a bore. In various embodiments, the method may further comprise coupling an alignment fixture having an alignment pin to the housing (1106) and inserting the alignment pin into the cavity. The method may further comprise inserting a sensor element having a second CTE into the cavity past the lead wire and into the bore of the lower insulator and aligning the sensor element with the alignment pin (1108). The method may further comprise coupling the lead wire to the sensor element, aligning an upper insulator having the fourth CTE and comprising a clearance cutout with the alignment pin, and inserting the upper insulator into the cavity (1110). The method may further comprise aligning a cap having a third CTE with the alignment pin and filling a remainder of the cavity with the cap (1112). In various embodiments, the method may further comprise determining a compressive force F in response to a difference between at least one of the first CTE and/or the second CTE, the third CTE and/or the fourth CTE and applying the compressive force F to the cap (1114). In various embodiments, the method may further comprise coupling the cap to the housing while the compressive force F is applied to the cap (1116). In various embodiments, the method may further comprise selecting the first CTE, the second CTE, the third CTE, and the fourth CTE such that an average of the second CTE, the third CTE, and the fourth CTE is greater than the first CTE or, in other words, the average CTE of the components internal to the housing is greater than the CTE of the housing (1118).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A low profile embedded blade tip clearance (BTC) probe, comprising:

a housing defining a cavity therewithin;

a lower insulator disposed within the cavity;

a sensor element disposed within the cavity;
an upper insulator disposed within the cavity;
a cap wherein the cap fills a remainder of the cavity; and
a hard lead in electronic communication with the sensor element and the housing,
wherein the upper insulator comprises a first alignment hole and a clearance cutout, and
wherein the cap comprises disk having an upper surface and a lower surface, a second alignment hole through the upper surface and the lower surface, and a hemispherical clearance cutout proximate the lower surface, wherein the lower surface is in contact with the upper insulator.

2. The low profile embedded BTC probe of claim 1, wherein the housing further comprises a top surface, a bottom surface, a step, and a first bore, wherein the cavity extends from the top surface to the step, wherein the first bore extends from the step through the bottom surface, wherein the cavity comprises a first diameter and the first bore comprises a second diameter wherein the second diameter is less than the first diameter.

3. The low profile embedded BTC probe of claim 2, wherein the lower insulator further comprises a first flange, a cylindrical extrusion, and a second bore comprising a third diameter wherein the third diameter is less than the second diameter, wherein the first flange is in contact with the step and wherein the cylindrical extrusion is disposed within the first bore.

4. The low profile embedded BTC probe of claim 3, wherein the sensor element comprises a cylinder having a base and second flange opposite the base, wherein the second flange is in contact with the first flange and the cylinder is disposed within the second bore.

5. The low profile embedded BTC probe of claim 4, wherein an internal stress is locked within the low profile embedded BTC probe in response to coupling the cap to the housing.

6. The low profile embedded BTC probe of claim 5, wherein the housing comprises a first coefficient of thermal expansion (CTE), the sensor element comprises a second CTE, the cap comprises a third CTE, the upper insulator and the lower insulator comprise a fourth CTE, and wherein the first CTE, the second CTE, the third CTE, and the fourth CTE are selected such that an average of the second CTE, the third CTE, and the fourth CTE is greater than the first CTE.

7. The low profile embedded BTC probe of claim 6, wherein a difference between a combined axial growth, comprising an axial growth along an axis of the sensor element, an axial growth along an axis of the upper insulator, and an axial growth along an axis of the lower insulator in response to a temperature, and at least one of an axial growth of the housing along the axis of the sensor element in response to the temperature or an axial growth of the cap along the axis of the sensor element in response to the temperature is between about 0.00001 inches and 0.0004 inches where about in this context means±0.000001 inches.

8. A gas turbine engine comprising:
a fan section comprising:
a fan having a blade having a tip;
a fan case having an inner aerodynamic surface and a rub strip;
the blade proximate the inner aerodynamic surface; and
a low profile embedded blade tip clearance (BTC) probe, comprising:
a housing having a cavity disposed radially outward of a blade;

a lower insulator disposed within the cavity;
a sensor element disposed within the cavity;
an upper insulator disposed within the cavity;
a cap wherein the cap fills a remainder of the cavity; and
a hard lead in electronic communication with the sensor element and the housing,
wherein the upper insulator comprises a first alignment hole and a clearance cutout,
wherein the cap comprises disk having an upper surface and a lower surface, a second alignment hole through the upper surface and the lower surface, and a hemispherical clearance cutout proximate the lower surface, wherein the lower surface is in contact with the upper insulator.

9. The gas turbine engine of claim 8, wherein the housing further comprises a top surface, a bottom surface, a step, and a first bore, wherein the cavity extends from the top surface to the step, wherein the first bore extends from the step through the bottom surface, wherein the cavity comprises a first diameter and the first bore comprises a second diameter wherein the second diameter is less than the first diameter.

10. The gas turbine engine of claim 9, wherein the lower insulator further comprises a first flange, a cylindrical extrusion, and a second bore comprising a third diameter wherein the third diameter is less than the second diameter, wherein the first flange is in contact with the step and wherein the cylindrical extrusion is disposed within the first bore.

11. The gas turbine engine of claim 10, wherein the sensor element comprises a cylinder having a base and second flange opposite the base, wherein the second flange is in contact with the first flange and the cylinder is disposed within the second bore.

12. The gas turbine engine of claim 11, wherein an internal stress is locked within the low profile embedded BTC probe in response to coupling the cap to the housing.

13. The gas turbine engine of claim 12, wherein the housing comprises a first coefficient of thermal expansion (CTE), the sensor element comprises a second CTE, the cap comprises a third CTE, the upper insulator and the lower insulator comprise a fourth CTE, and wherein the first CTE, the second CTE, the third CTE, and the fourth CTE are selected such that an average of the second CTE, the third CTE, and the fourth CTE is greater than the first CTE.

14. The gas turbine engine of claim 13, wherein a difference between a combined axial growth, comprising an axial growth along an axis of the sensor element, an axial growth along an axis of the upper insulator, and an axial growth along an axis of the lower insulator in response to a temperature, and at least one of an axial growth of the housing along the axis of the sensor element in response to the temperature or an axial growth of the cap along the axis of the sensor element in response to the temperature is between about 0.00001 inches and 0.0004 inches where about in this context means±0.000001 inches.

15. A method of manufacturing a low profile embedded blade tip clearance (BTC) probe, the method comprising:
forming a housing having a first coefficient of thermal expansion (CTE), a cavity, and a neck, inserting a hard lead comprising a hard shield and a lead wire into the neck, and coupling the hard lead to the neck about the hard shield;
bending the lead wire toward a sidewall of the cavity and inserting a lower insulator having a fourth CTE into the cavity past the lead wire, wherein the lower insulator comprises a bore;

coupling an alignment fixture having an alignment pin to the housing and inserting the alignment pin into the cavity;

inserting a sensor element having a second CTE into the cavity past the lead wire and into the bore of the lower insulator and aligning the sensor element with the alignment pin;

coupling the lead wire to the sensor element;

aligning an upper insulator having the fourth CTE and comprising a clearance cutout with the alignment pin;

inserting the upper insulator into the cavity;

aligning a cap having a third CTE with the alignment pin and filling a remainder of the cavity with the cap; and coupling the cap to the housing while a compressive force F is applied to the cap.

16. The method of claim 15, further comprising determining the compressive force F in response to a difference between at least one of the first CTE, the second CTE, the third CTE, and/or the fourth CTE; and selecting the first CTE, the second CTE, the third CTE, and the fourth CTE such that an average of the second CTE, the third CTE, and the fourth CTE is greater than the first CTE.

* * * * *